United States Patent [19]

Long

[11] Patent Number: 4,881,246
[45] Date of Patent: Nov. 14, 1989

[54] METHOD AND APPARATUS FOR DEMODULATING A CLASS OF M-ARY PHASE SHIFT KEYED (PSK) SIGNALS

[75] Inventor: James C. Long, Sunnyvale, Calif.
[73] Assignee: First Pacific Networks, Sunnyvale, Calif.
[21] Appl. No.: 317,211
[22] Filed: Feb. 28, 1989
[51] Int. Cl.⁴ ............................................. H04L 27/22
[52] U.S. Cl. ..................................... 375/84; 329/304; 375/85
[58] Field of Search ................................... 375/81–84, 375/86; 329/118, 112, 110, 145

[56] References Cited

U.S. PATENT DOCUMENTS

| | | | |
|---|---|---|---|
| 4,064,361 | 12/1977 | Kustka et al. | 329/145 |
| 4,416,016 | 11/1983 | Iapicco | 329/145 |
| 4,618,830 | 10/1986 | Mori et al. | 375/84 |
| 4,715,047 | 12/1987 | Hambley | 375/84 |

OTHER PUBLICATIONS

*Digital Communications–Satellite/Earth Station Engineering,* Kamilo Feher, Prentice-Hall, 1983, pp. 170–171.

Primary Examiner—Robert L. Griffin
Assistant Examiner—Marianne Huseman
Attorney, Agent, or Firm—Townsend and Townsend

[57] ABSTRACT

A method and an apparatus for demodulating M-ary PSK signals of the type wherein the modulation is limited to phase transitions between adjacent phase states. The method is operative in a demodulator which comprises a phase splitter dividing a source signal into three paths with a preselected phase relationship among phases, one of the phases being delayed by nominally one bit period, a pair of mixers or multipliers, each one of the mixers receiving as one input a representation of the delayed-phase component and each one of the mixers receiving as a second input a representation of one of the other of the phase components. Combined signals are provided by the mixers to a combiner which adds or subtracts the combined signals according to expected input signal type to produce from one to N intermediate output signals. An intermediate output signal is coupled to a corresponding two-level comparator, each of which receives and responds to the respective intermediate output signals to produce a digital output. Digital logic circuitry responds to the digital outputs of each of the comparators to map the digital outputs into a single digital bit stream of ones and zeroes.

7 Claims, 4 Drawing Sheets

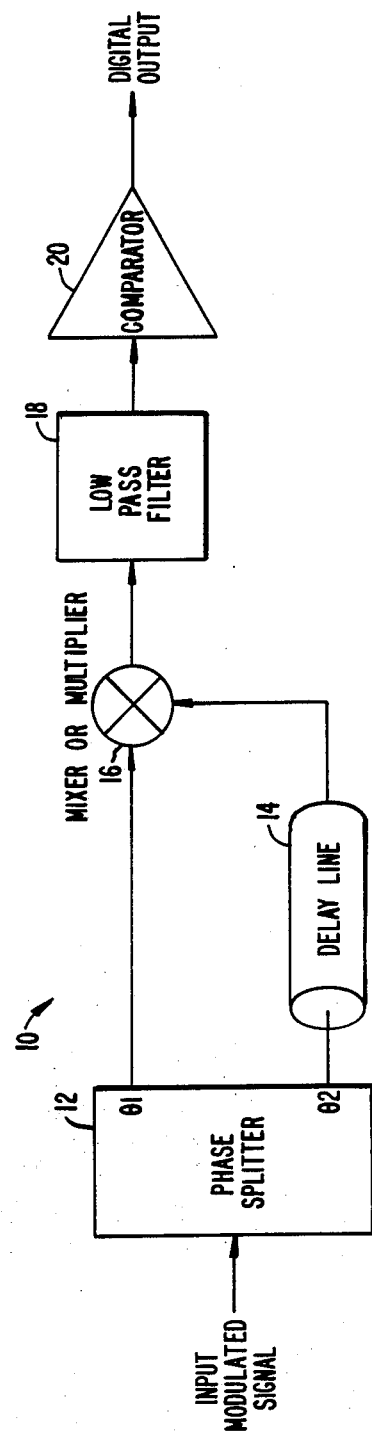
FIG._1. PRIOR ART
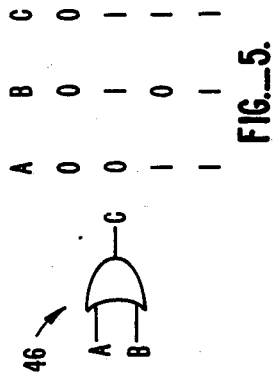
FIG._5.

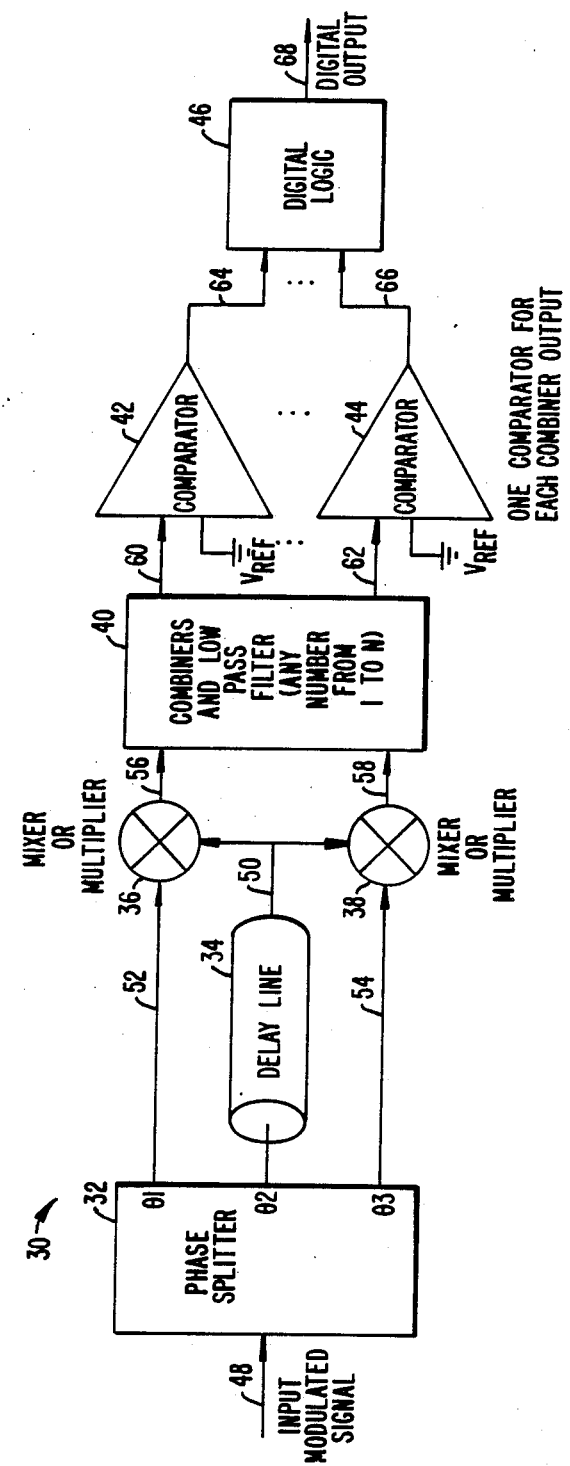
FIG._2.

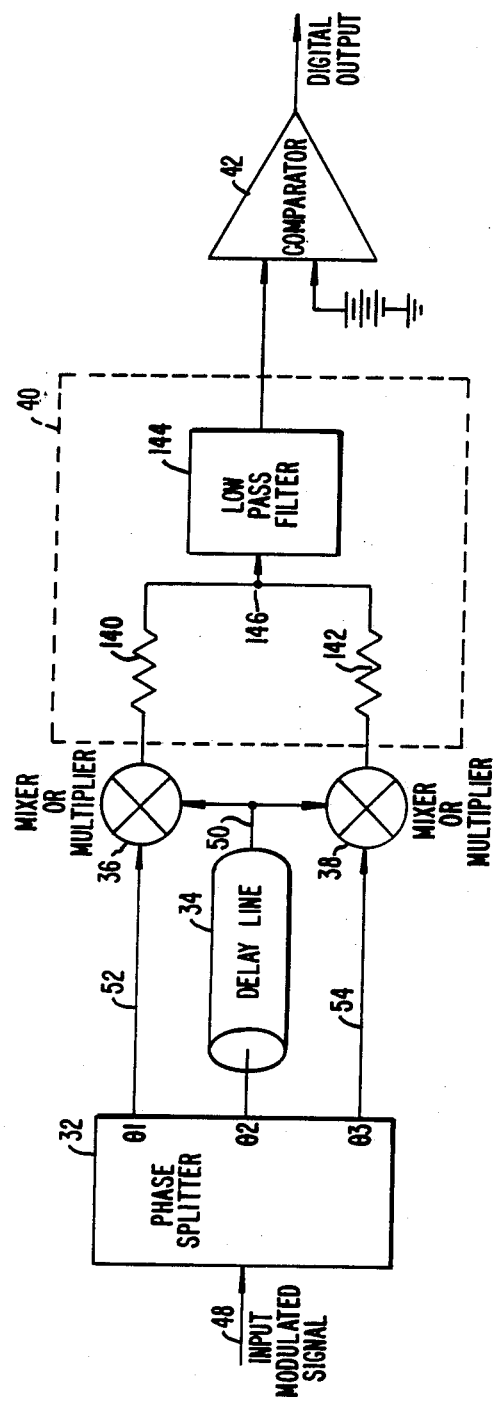
FIG._3.

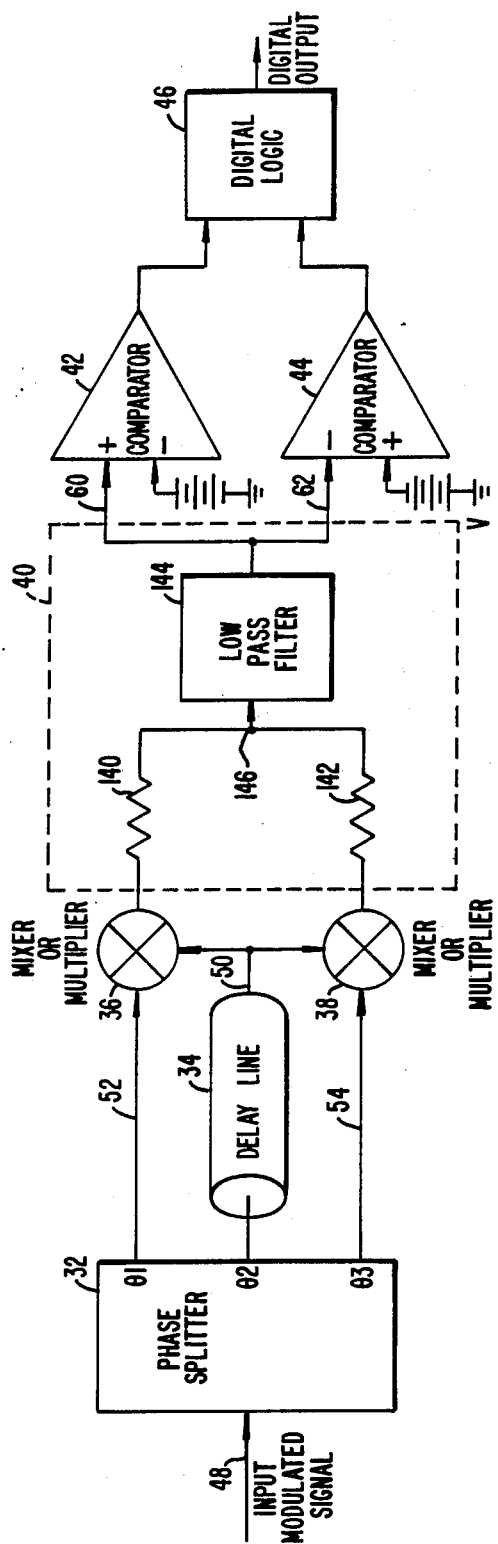
FIG._4.

METHOD AND APPARATUS FOR DEMODULATING A CLASS OF M-ARY PHASE SHIFT KEYED (PSK) SIGNALS

BACKGROUND OF THE INVENTION

This invention relates to demodulation of a class of M-ary PSK signals, and more particularly, to apparatus and methods for demodulating a large class of digital phase shift keyed modulated signals wherein phase change is limited to adjacent phase states.

Digital phase shift keyed signals (PSK signals) find wide application in communication. The signals are produced by discrete changes in phase of a periodic waveform. Phase is changed in accordance with a serial digital data stream acting as a control signal. The present invention has particular application to PSK signals wherein modulation is limited to phase transitions between adjacent phase states.

Prior art PSK modulation schemes have required demodulators whose complexity is proportional to the complexity of the modulated signal. For example, a binary PSK signal requires a relatively simple demodulator consisting of a single channel with a single multiplier used in connection with a local phase reference. A quadrature phase shift keyed (QPSK) signal on the other hand, as in the past required two phase references and two multipliers. As the number of phases increases, so also does the complexity of the circuitry which is used to synchronize the locally-generated phase reference. The locally-generated reference takes a finite time to become synchronized, which causes the first portion of a message to not demodulate properly during burst mode transmission. Such circuitry is complex and potentially expensive, but in the past has been necessary to provide a sufficient margin in the required signal-to-noise ratio for a given bit-error rate.

FIG. 1 shows a typical prior art bipolar phase shift keyed (BPSK) demodulator 10 suitable for demodulating burst mode BPSK transmissions. Referring to FIG. 1, a demodulator 10 employs a phase splitter 12 providing as two outputs a first phase component $\theta_1$ and a second phase component $\theta_2$, wherein the second phase component is provided through a short delay line 14 (providing a nominal delay of one bit period), the output of the first phase component and the second phase component being mixed together in a mixer or multiplier 16 to produce a baseband bit stream to be directed through a lowpass filter 18 The output of the lowpass filter 18 is suitable for application to a two-level comparator 20, which is used to produce a stream of ones and zeroes as a digital output.

Quadrature phase shift keyed modulation has required more complex demodulators. An example is found in the textbook *Digital Communications - Satellite/Earth Station Engineering,* by Kamilo Feher, (Prentice-Hall, 1983), pp. 170–171. Therein is described a differential offset QPSK demodulator and a differential QPSK demodulator. In this demodulator, the in-phase (I) output and the quadrature-phase (Q) output are separately converted into digital levels before recombination into a serial data stream. The recombination requires a priori knowledge of the bit clock phase. This demodulator only works for QPSK signals. It is believed that there have never before been such simple demodulators for higher order M-ary PSK signals.

What is needed is a simple demodulator for QPSK which eliminates ambiguity of reinterleaving the signals and which can be used with M-ary PSK signals in situations where signal-to-noise ratio is not a primary consideration and which can also produce valid data with minimal delay from the start of transmission.

SUMMARY OF THE INVENTION

According to the invention, a method and an apparatus are provided for demodulating M-ary PSK signals of the type wherein the modulation is limited to phase transitions between adjacent phase states. The method is operative in a demodulator which comprises a phase splitter dividing a source signal into three paths with a preselected phase relationship among phases, one of the phases being delayed by nominally one bit period, a pair of mixers or multipliers, each one of the mixers receiving as one input a representation of the delayed-phase component and each one of the mixers receiving as a second input a representation of one of the other of the phase components. Mixed signals are provided by the mixers to a combiner which adds or subtracts the combined signals according to expected input signal type to produce from one to N intermediate output signals. An intermediate output signal is coupled to a corresponding two-level comparator, each of which receives and responds to the respective intermediate output signals to produce a digital output. Digital logic circuitry responds to the digital outputs of each of the comparators to map the digital outputs into a single digital bit stream of ones and zeroes. The resultant loss of margin and the signal-to-noise ratio is offset by corresponding simplification of the demodulation circuitry and cost savings. However, the spectral efficiency of a complex M-ary PSK signal is retained.

BRIEF DESCRIPTION OF THE DRAWINGS

FIG. 1 is a schematic block diagram of a BPSK demodulator suitable for use in accordance with the prior art.

FIG. 2 is a schematic block diagram of a general M-ary PSK demodulator in accordance with the invention.

FIG. 3 is a schematic block diagram of a portion of a first specific DOQPSK demodulator.

FIG. 4 is a schematic block diagram of a portion of a second specific DOMPSK demodulator.

FIG. 5 is a schematic diagram of digital logic circuitry for decoding the outputs of comparators of the example of FIG. 4.

DESCRIPTION OF SPECIFIC EMBODIMENTS

Referring to FIG. 2, there is shown a specific embodiment of a demodulator 30. The demodulator 30 has a phase splitter 32 producing three outputs, a single delay line 34, a first mixer 36, a second mixer 38, and a combiner 40 in accordance with the invention. In addition, each specific embodiment of the invention has a selected number of combiner output channels whose signals may be analyzed in combination to extract a desired digital output. Specifically as shown in FIG. 2, there is a first comparator 42, a second comparator 44 and digital logic circuitry 46, as hereinafter explained.

The phase splitter 32 has a single analog signal input 48 for receiving a modulated signal dividing a source signal into three paths with a preselected phase relationship among phases, one of the phases being delayed by nominally one bit period through the delay line 34 or its equivalent, such as a charge-coupled device (CCD). At this stage of the demodulator, the full spectrum of frequency components should be preserved such that the signal can be demodulated. The pair of mixers 36 and 38 may be multipliers, each one of the mixers 36 and 38 receiving on one input line 50 a representation of the delayed-phase component and each one of the mixers 36 and 38 also receiving on a second input line 52 and 54 a representation of one of the other of the phase components from the phase splitter 32. Examples of the phases out of the phase splitter 32 are $\theta_1$ is 0°, $\theta_2$ is 45°, and $\theta_3$ is 90°. The delay of the delay line 34 is applied to the 45° phase line, and the nominal delay is one bit and the phase delay is a multiple of 360° at the carrier frequency of the input at input port 48.

Two combined signals on signal lines 56 and 58 are provided by the mixers 36 and 38 to the combiner 40. The combiner 40 is customized to the type of demodulation desired, as hereinafter explained. The combiner 40 adds or subtracts the signals with selected weighting according to expected input signal type to produce from one to N intermediate output signals on for example signal lines 60 and 62, for a two-output combination. The intermediate output signals from the combiner 40, which incorporates low-pass filters, are filtered to remove extraneous high frequency components and then are respectively coupled on signal lines 60 and 62 to corresponding two-level comparators 42 and 44, each of which responds to produce a respective digital binary-level output on output lines 64 and 66 to digital logic circuitry 46. The digital logic circuitry 46 responds to the digital outputs of each of the comparators 42 and 44 to map the digital outputs into a single digital bit stream of ones and zeroes on output line 68.

An example is useful for understanding the operation of the invention and the function of the components in the specific embodiment. Referring to FIG. 3, a first example is Differential Offset Quadrature Phase Shift Keyed (DOQPSK) modulation wherein transitions are only between adjacent phase states. Consider an input signal having modulated phases shifted +90°, 0° and −90° applied to phase splitter 32 through input port 48.

The phase splitter 32 produces fixed-phase-shifted outputs of $\theta_1 = +45°$, $\theta_2 = 0°$, and $\theta_3 = -45°$. (These phase relationships are essentially identical to those described above. The key is that there is a differential of 45° between the two inputs to each of the mixers 36 and 38.) The delay line 34 length is one bit with a 0° net phase shift (e.g., 720°). An error of ±15% on delay and net ±15. in phase is not critical and is therefore considered to be within the meaning of one bit delay with zero net phase shift.

The combiner 40 comprises a first resistor 140, a second resistor 142 and a lowpass filter 144. The first resistor 140 has one terminal coupled to the mixer 36 and the other terminal coupled to a mixing node 146. The second resistor 142 has one terminal coupled to the mixer 38 and the other terminal coupled to the mixing node 146. The mixing node 146 is coupled to the input of the lowpass filter 144. The combiner 40 thus is a device having the following transfer characteristics for unity voltage at the three phase outputs of the phase splitter 32:

| Phase change at input 48 | Mixer 36 Voltage Out | Mixer 38 Voltage Out | Combiner Volt. Out |
|---|---|---|---|
| (a) 0° to 90° | −0.707 | +0.707 | 0.00 |
| (b) 0° to −90° | +0.707 | −0.707 | 0.00 |
| (c) 0° to 0° | +0.707 | +0.707 | 1.414/2 |

Referring to FIG. 3 showing a specific example, the output of the combiner 40 is applied to a single comparator 42, since further comparators are unnecessary in the case of DOQPSK. The logic level output of the comparator 42 in the above example thus for case (a) is 0, for case (b) is 0, and for case (c) is 1.

From the above, it is seen that for the case of DOQPSK, the summing of outputs with equal weights and use of a comparator to hard limit the output at a decision level of 0.3535 Volt (½ of 0.707 Volt, the resultant high voltage output of the combiner), will result in the reconstruction of the original data. Digital logic circuitry 46 is unneeded to decode the output of a single comparator, such as the comparator 42. Hence, the output of the comparator 42 is &:he desired digital data stream.

A single output of the combiner 40 can be coupled to the inputs of two standard dual-input comparators 42, 44 (shown in generalization in FIG. 2). In such a configuration, more complex differential offset M-ary Phase Shift Keyed (DOMPSK) modulation can be analyzed with simple circuitry. An example follows:

Referring to FIG. 4, a second example is an Offset M-ary Phase Shift Keyed (OMPSK) modulation wherein transitions are only between adjacent phase states. Consider an input signal having modulated phases shifted $=\Delta°$, 0° and $-\Delta°$ applied to phase splitter 32 through input port 48. The following are the transfer characteristics for unity voltage at the output of the phase splitter where the differential phase shift is less than 180 but not exactly 90°:

The phase splitter 32 produces fixed-phase-shifted outputs of $\theta_1 = +90\Delta°$, $\theta_2 + 0°$, and $\theta_3 = +90° - \Delta$.

| Phase change at input 48 | Mixer 36 Voltage Out | Mixer 38 Voltage Out | Combiner Volt. Out |
|---|---|---|---|
| (a) 0° to +Δ° | SIN +2Δ° | SIN 0° | (½)SIN +2Δ° |
| (b) 0° to −Δ° | SIN 0° | SIN −2Δ° | (½)SIN −2Δ° |
| (c) 0° to 0° | SIN +Δ° | SIN −Δ° | 0 |

The combiner 40 is identical to that of the combiner of FIG. 3. Here, however, the single output of the combiner 40 is applied on lines 60 and 62 to a positive-referenced input of a first comparator 42 and a negative-reference input of a second comparator 44, respectively; each of which is independently referenced to different voltage references of equal magnitude but opposite polarities. The output of the comparators 42 and 44 in the above example thus depends on the magnitude of Δ to determine the binary logic levels for cases (a), (b), and (c). The logic level output of the comparator 42 in the above example thus for case (a) is 1, for case (b) is 1, and for case (c) is 0.

From the above, it is seen that for the case of OMPSK, the summing of outputs with equal weights and use of a comparator to hard limit the output at decision levels of (½) of (½)SIN(+2Δ°) Volt and (½) of (½)SIN(−2 Δ°) Volt, the apparatus will reconstruct the original data if appropriate digital logic circuitry 46 is employed. Simple digital logic circuitry 46 is needed to decode the output of two comparators, such as the comparators 42 and 44.

Referring to FIG. 5, there is shown one suitable circuit for digital logic circuitry 46 in accordance with the invention. The digital logic circuitry 46 is merely a two-input OR gate. In a more general case, the digital logic circuit 46 would be of a design to provide decoding of signals from a plurality of comparators into a single digital data bit stream. In such a configuration, more complex differential and nondifferential offset M-ary Phase Shift Keyed modulation can be demodulated with simple circuitry.

The invention has now been described with reference to specific embodiments. Other embodiments will be apparent to those of ordinary skill in the art. For example, the method according to the invention can be practiced in a special case wherein phase changes are limited to a plurality of selected phase states between +90° and −90° relative to an initial phase state. In such special cases, comparing comprises identifying each phase state by means of an individual comparator 42, 44 (FIG. (2), the number of individual comparators 42, 44 being one less than the number of possible phase states. It is therefore not intended that this invention be limited, except as indicated in the appended claims.

I claim:

1. A method for demodulating an M-ary phase shift keyed (MPSK) signal wherein modulation is constrained to phase transitions between adjacent phase states, said method comprising the steps of:

dividing a source signal into three paths with a preselected phase relationship among a first phase component, a second phase component and a third phase component;

delaying said second phase component by nominally one bit period, said delayed second phase component having a phase difference relative to both said first phase component and said third phase component, to produce a delayed-phase component;

mixing a representation of the delayed-phase component and said first phase component to produce a first mixed signal;

mixing a representation of the delayed-phase component and said third phase component to produce a second mixed signal;

combining said first mixed signal and said second mixed signal to produce a weighted mixed signal according to expected input signal type; and comparing said weighted mixed signal against preselected decision thresholds in at least one comparator means to produce a digital output signal.

2. The method according to claim 1 wherein a plurality of two-level comparator means are provided, further including the steps of:

identifying different signal levels of said weighted mixed signal; and analyzing said different signal levels of said two-level comparator means in order to combine said outputs of said two-level comparator means to produce said digital output signal.

3. The method according to claim 2 wherein exactly two-level comparator means are provided, and wherein said digital logic circuit means comprises a two-input OR gate.

4. The method according to claim 1 wherein phase changes are limited to selected phase state between +90° and −90° relative to an initial phase state, and wherein said comparing step comprises identifying each phase state by means of an individual comparator, the number of said individual comparators being one less than the number of possible phase states.

5. An apparatus for demodulating an M-ary Phase Shift Keyed modulated signal wherein modulation is constrained to phase transitions between adjacent phase states, said apparatus comprising:

a phase splitter means for dividing a source signal into three paths with a preselected phase relationship among a first phase component, a second phase component and a third phase component;

a delay means coupled to receive as an input said second phase component from said phase splitter, said second phase component being delayed by nominally one bit period at an output of said delay means as a delayed-phase component, said delayed phase component have a phase between said first phase component and said third phase component;

a first mixer;

a second mixer;

each one of said first mixer and said second mixer coupled to receive as one input a representation of the delayed-phase component and said first mixer coupled to receive as a second input a representation of said first phase component to produce a first mixed signal, and said second mixer coupled to receive as a second input a representation of said third phase component to produce a second mixed signal;

means coupled to receive said first mixed signal and said second mixed signal for combining said first mixed signal and said second mixed signal to produce a weighted mixed signal according to expected input signal type; and at least one two-level comparator means, each one of said two-level comparator means being coupled to receive said weighted mixed signal to produce a digital output signal.

6. The apparatus according to claim 5 wherein a plurality of two-level comparator means are provided for identifying different signal levels of said weighted mixed signal, and further comprising digital logic circuit means coupled to receive outputs of said two-level comparator means in order to combine said outputs of said two-level comparator means to produce said digital output signal.

7. The apparatus according to claim 6 wherein exactly two-level comparator means are provided, and wherein said digital logic circuit means comprises a two-input OR gate.

* * * * *